(12) United States Patent
Sakazaki et al.

(10) Patent No.: US 8,329,274 B2
(45) Date of Patent: Dec. 11, 2012

(54) FUEL HOSE

(75) Inventors: Kazushige Sakazaki, Komaki (JP); Hiroyoshi Mori, Iwakura (JP); Shinji Iio, Komaki (JP)

(73) Assignee: Tokai Rubber Industries, Ltd., Komaki-shi, Aichi (JP)

( * ) Notice: Subject to any disclaimer, the term of this patent is extended or adjusted under 35 U.S.C. 154(b) by 1273 days.

(21) Appl. No.: 11/727,543

(22) Filed: Mar. 27, 2007

(65) Prior Publication Data

US 2007/0231522 A1 Oct. 4, 2007

(30) Foreign Application Priority Data

Mar. 28, 2006 (JP) .................. 2006-089073

(51) Int. Cl.
*B32B 1/08* (2006.01)
*F16L 9/14* (2006.01)
*F16L 11/04* (2006.01)

(52) U.S. Cl. .............. 428/36.91; 428/34.7; 428/36.6; 428/36.8; 138/137; 138/141

(58) Field of Classification Search .......... 428/34.1, 428/34.4, 34.6, 34.7, 35.7, 36, 36.6, 36.7, 428/36.8, 36.9, 36.91; 138/137, 141
See application file for complete search history.

(56) References Cited

U.S. PATENT DOCUMENTS

| | | | | |
|---|---|---|---|---|
| 5,093,426 A | * | 3/1992 | Sakabe et al. | 525/223 |
| 5,639,528 A | * | 6/1997 | Feit et al. | 428/36.91 |
| 6,812,312 B1 | * | 11/2004 | Ito et al. | 526/313 |
| 7,569,275 B2 | * | 8/2009 | Fukushi et al. | 428/421 |
| 2003/0124289 A1 | | 7/2003 | Yamamoto et al. | |
| 2005/0208248 A1 | | 9/2005 | Ilo et al. | |

FOREIGN PATENT DOCUMENTS

| | | |
|---|---|---|
| EP | 1314759 A1 | 5/2003 |
| JP | 8-169085 A | 7/1996 |
| JP | 08-294998 A | 11/1996 |
| JP | 9-316414 A | 12/1997 |
| JP | 2005-299629 A | 10/2005 |
| JP | 2005-344800 A | 12/2005 |

OTHER PUBLICATIONS

Japanese Office Action dated Jan. 13, 2009, issued in corresponding Japanese Patent Application No. 2006-089073.
French Search Report dated Nov. 3, 2010, issued in corresponding French Patent Application No. 0702209.

* cited by examiner

*Primary Examiner* — Walter B Aughenbaugh
(74) *Attorney, Agent, or Firm* — Westerman, Hattori, Daniels & Adrian, LLP

(57) ABSTRACT

A fuel hose comprising a laminated structure of a tubular resin layer and an adjoining rubber layer, the rubber layer being formed by a rubber composition containing the following (A) to (E) as essential components and the following (F) at less than 0.1 parts by weight based on 100 parts by weight of the following (A) as an optional component, and the resin layer being formed by a material containing a tetrafluoroethylene-hexafluoropropylene-vinylidene fluoride-perfluoroalkyl vinyl ether quaternary polymer as a main component:
(A) diene rubber;
(B) a sulfur vulcanizing agent;
(C) at least one selected from the group consisting of 1,8-diazabicyclo[5.4.0]undecene-7 salt, 1,5-diazabicyclo[4.3.0]nonene-5 salt, 1,8-diazabicyclo[5.4.0]undecene-7 and 1,5-diazabicyclo[4.3.0]nonene-5;
(D) at least one of metallic salt of carbamate and metallic salt of thiazole;
(E) magnesium oxide; and
(F) zinc oxide.

4 Claims, 1 Drawing Sheet

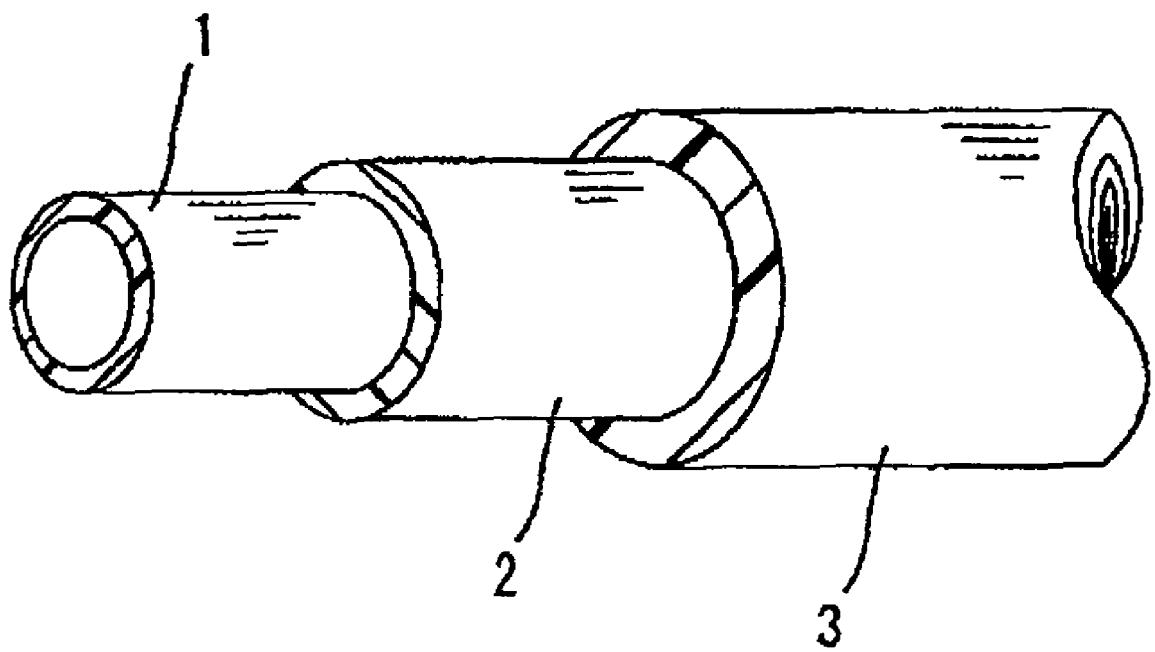

FUEL HOSE

BACKGROUND OF THE INVENTION

1. Field of the Invention

The present invention relates to a fuel hose for transportation or the like of fuel for automobiles and the like such as gasoline, alcohol-containing gasoline, diesel fuel, RME (fatty acid methyl ester)-containing diesel fuel, GTL (Gas to Liquid)-containing diesel fuel, CNG (Compressed Natural Gas) or LPG (Liquefied Petroleum Gas).

2. Description of the Art

With growing worldwide awareness of environmental issues, the control of the amount of fuel permeation from an automotive fuel hose and the like has been enhanced. Particularly in North America, stringent regulations against fuel permeation are recently coming into effect. Under such a situation, a fuel hose has been proposed which includes a three-layer structure having an inner layer composed of acrylonitrile-butadiene rubber (NBR), an intermediate layer composed of a tetrafluoroethylene-hexafluoropropylene-vinylidene fluoride terpolymer (THV) and an outer layer composed of NBR-PVC, or which includes a four-layer structure having the same inner layer, the same intermediate layer, an outer layer composed of NBR and an outermost layer composed of chlorosulfonated polyethylene rubber (CSM).

However, the layer including NBR does not adhere well to the layer made of THV. Therefore, a fuel hose having improved interlaminar adhesion between the layer including NBR and the layer made of THV by adding 1,8-diazabicyclo[5.4.0]undecene-7 salt (DBU salt) into the layer including NBR has been proposed (see Japanese Unexamined Patent Publication No. 8-169085 (1996)).

Such a countermeasure is effective for the case where the above-mentioned ternary THV is used. However, in the case where a quaternary THV, excellent in craze resistance and fuel permeation resistance, is used, the layer including NBR does not adhere well to the layer made of THV, even if DBU salt is added to the layer including NBR.

In view of the foregoing, it is an object of the present invention to provide a fuel hose excellent in fuel permeation resistance and interlaminar adhesion.

SUMMARY OF THE INVENTION

In order to achieve the aforesaid object, according to the present invention, there is provided a fuel hose comprising a laminated structure of a tubular resin layer and an adjoining rubber layer, the rubber layer being formed by a rubber composition containing the following (A) to (E) as essential components and the following (F) at less than 0.1 parts by weight based on 100 parts by weight of the following (A) as an optional component, and the resin layer being formed by a material containing a tetrafluoroethylene-hexafluoropropylene-vinylidene fluoride-perfluoroalkyl vinyl ether quaternary polymer as a main component:

(A) diene rubber;
(B) a sulfur vulcanizing agent;
(C) at least one selected from the group consisting of
 1,8-diazabicyclo[5.4.0]undecene-7 salt,
 1,5-diazabicyclo[4.3.0]nonene-5 salt,
 1,8-diazabicyclo[5.4.0]undecene-7 and
 1,5-diazabicyclo[4.3.0]nonene-5;
(D) at least one of metallic salt of carbamate and metallic salt of thiazole;
(E) magnesium oxide; and
(F) zinc oxide.

The inventors of the present invention conducted intensive studies to obtain a fuel hose excellent in fuel permeation resistance and interlaminar adhesion. As a result, they found that in the general case where zinc oxide is used as an acid receiver for a diene rubber material, such as NBR, vulcanizing speed is too fast, so that adhesive response balance with THV is bad, resulting in deterioration of adhesiveness. Therefore, they have piled up experiments to obtain diene rubber material compatible between vulcanizing speed and adhesive response balance. As a result, they found that when a rubber layer is formed by using diene rubber, vulcanizable by sulfur, and a sulfur vulcanizing agent, together with either of DBU salt or DBU and either of 1,5-diazabicyclo[4.3.0]nonene-5 salt (DBN salt) or DBN, and also using at least one of metallic salt of carbamate and metallic salt of thiazole, and further adding magnesium oxide instead of zinc oxide, vulcanizing balance becomes good, so that interlaminar adhesion with a resin layer of which main component is tetrafluoroethylene-hexafluoropropylene-vinylidene fluoride-perfluoroalkyl vinyl ether quaternary polymer (THV) is excellent. Thus, they attained the present invention.

Since the fuel hose of the present invention has a laminated structure of a diene rubber layer obtained by using diene rubber (such as NBR), DBU salt, a sulfur vulcanizing agent, at least one of metallic salt of carbamate and metallic salt of thiazole, and magnesium oxide, and an adjoining THV layer in this manner, the interlaminar adhesion therebetween is improved by the above-mentioned reason.

When the rubber composition further includes a peroxide vulcanizing agent, the interlaminar adhesion between the diene rubber layer and the THV layer is further improved.

BRIEF DESCRIPTION OF THE DRAWING

The sole FIGURE of the drawing is a diagram illustrating the construction of an exemplary automotive fuel hose according to the present invention.

DESCRIPTION OF THE PREFERRED EMBODIMENTS

Embodiments of the present invention will hereinafter be described in detail.

A fuel hose according to the present invention has a laminated structure including a tubular resin layer and an adjoining rubber layer.

According to the present invention, the rubber layer is formed by a rubber composition containing the following (A) to (E) as essential components and the following (F) at less than 0.1 parts by weight (just abbreviated to "parts" hereinafter) based on 100 parts of the following (A) as an optional component, and the resin layer being formed by a material containing a tetrafluoroethylene-hexafluoropropylene-vinylidene fluoride-perfluoroalkyl vinyl ether quaternary polymer as a main component:

(A) diene rubber;
(B) a sulfur vulcanizing agent;
(C) at least one selected from the group consisting of
 1,8-diazabicyclo[5.4.0]undecene-7 salt,
 1,5-diazabicyclo[4.3.0]nonene-5 salt,
 1,8-diazabicyclo[5.4.0]undecene-7 and
 1,5-diazabicyclo[4.3.0]nonene-5;
(D) at least one of metallic salt of carbamate and metallic salt of thiazole;
(E) magnesium oxide; and
(F) zinc oxide,
which is the main feature of the present invention.

As shown in the FIGURE, a fuel hose according to one embodiment of the present invention includes, for example, a tubular inner layer 1, an intermediate layer 2 formed on an outer peripheral surface of the inner layer and an outer layer 3 formed on an outer peripheral surface of the intermediate layer, and the inner layer and the outer layer are formed by the above-mentioned rubber material and the intermediate layer is formed by a material of which main component is a tetrafluoroethylene-hexafluoropropylene-vinylidene fluoride-perfluoroalkyl vinyl ether quaternary polymer.

In the present invention, "main component" typically means a component occupying more than half, and also means a component occupying the entire.

As the material for forming the inner layer 1 (inner layer material) of the present invention and the material for forming the outer layer 3 (outer layer material), a rubber composition, including the above-mentioned (A) to (E) as essential components and the above-mentioned (F) as an optional component at less than 0.1 parts based on 100 parts of the above-mentioned (A), is used.

The diene rubber (component (A)) is not particularly limited as long as it is vulcanizable by sulfur. Examples thereof include acrylonitrile-butadiene rubber (NBR), a blend (NBR-PVC) of NBR and polyvinyl chloride (PVC), an ethylene-propylene-diene terpolymer (EPDM) and hydrin rubber (GECO). They may be used either alone or in combination. Among them, NBR and NBR-PVC are preferably used in terms of adhesiveness.

Examples of the sulfur vulcanizing agent (component (B)) include sulfur such as powdered sulfur, precipitated sulfur and insoluble sulfur, which may be used either alone or in combination.

The proportion of the sulfur vulcanizing agent (component (B)) is preferably 0.5 to 5 parts, particularly preferably 1 to 3 parts, based on 100 parts of the diene rubber (component (A)). When the proportion of the component (B) is less than 0.5 parts, adhesive response tends to deteriorate. When the proportion thereof is more than 5 parts, the resulting rubber tends to become too hard.

Examples of the component (C) used with the components (A) and (B) include 1,8-diazabicyclo[5.4.0]undecene-7 salt (DBU salt), 1,5-diazabicyclo[4.3.0]nonene-5 salt (DBN salt), DBU and DBN, which may be either alone or in combination.

Examples of 1,8-diazabicyclo[5.4.0]undecene-7 salt (DBU salt) of the component (C) include DBU-naphthoate, DBU-sorbate, DBU-formate, DBU-octoate DBU-oleate, DBU-o-phthalate, DBU-p-toluene-sulfonate, DBU-phenol resin salt and DBU-phenoate, which may be used either alone or in combination.

Examples of 1,5-diazabicyclo[4.3.0]nonene-5 salt (DBN salt) of the component (C) include DBN-naphthoate, DBN-sorbate, DBN-formate, DBN-octoate, DBN-oleate, DBN-o-phthalate, DBN-p-toluene-sulfonate, DBN-phenol resin salt and DBN-phenoate, which may be used either alone or in combination.

The proportion of DBU salts and the like (component (C)) is preferably 0.5 to 3 parts, particularly preferably 1 to 2 parts, based on 100 parts of the diene rubber (component (A)) in terms of interlaminar adhesion and rubber properties.

As the specific metallic salt (component (D)), at least one of metallic salt of carbamate and metallic salt of thiazole is used.

Examples of the metallic salt of carbamate include zinc dimethyldithiocarbamate (ZnMDC), zinc diethyldithiocarbamate (ZnEDC), zinc dibutyldithiocarbamate (ZnBDC), iron dimethyldithiocarbamate (FeMDC), zinc ethylphenyldithiocarbanate (ZnEPDC), zinc N-pentamethylene-dithiocarbamate, zinc dibenzyldithiocarbamate, sodium dimethyldithiocarbamate (NaMDC), sodium diethyldithiocarbamate (NaEDC), sodium dibutyldithiocarbamate (NaBDC), copper dimethyldithiocarbamate (CUMDC) and tellurium diethyldithiocarbamate (TeEDC), which may be used either alone or in combination. Among them, ZnMDC, ZnEDC and ZnBDC are preferably used in terms of adhesiveness and rubber properties.

The proportion of the specific metallic salt (component (D)) is preferably 0.01 to 0.5 parts, particularly preferably 0.05 to 0.3 parts, based on 100 parts of the diene rubber (component (A)). When the proportion of the component (D) is less than 0.01 parts, vulcanized rubber properties tend to deteriorate. When the proportion thereof is more than 0.5 parts, unvulcanized rubber properties tend to deteriorate.

The proportion of the magnesium oxide (component (E)) used together with the components (A) to (D) is preferably 3 to 20 parts, particularly preferably 5 to 15 parts, based on 100 parts of the diene rubber (component (A)) in terms of adhesiveness and rubber properties.

The rubber composition may include zinc oxide (component (F)) as an optional component at less than 0.1 parts based on 100 parts of the diene rubber (component (A)). When the proportion of the component (F) is not less than 0.1 parts, interlaminar adhesion deteriorates.

Each of the inner layer material and the outer layer material may appropriately include any of a peroxide vulcanizing agent, carbon black, lubricant (such as stearic acid), a flame retardant, a plasticizer, a vulcanizing agent (such as sulfur), a vulcanizing accelerator, a vulcanizing aid, an antioxidant, calcium carbonate or the like, as required, together with the above components (A) to (F).

Examples of the peroxide vulcanizing agent include 2,4-dichloro-benzoyl peroxide, benzoyl peroxide, 1,1-di(t-butylperoxy)-3,3,5-trimethyl cyclohexane, 2,5-dimetyl-2,5-dibenzoylperoxy hexane, n-butyl-4,4'-di(t-butylperoxy) valerate, dicumyl peroxide, t-butylperoxy benzoate, di(t-butylperoxy)diisopropylbenzene, t-butyl cumylperoxide, 2,5-dimethyl-2,5-di(t-butylperoxy)hexane, di-t-butylperoxide and 2,5-dimetyl-2,5-di(t-butylperoxy)hexyne-3, which may be used either alone or in combination. Among them, dicumyl peroxide is particularly preferred, because it is free from problems associated with odor or smell.

The proportion of the peroxide vulcanizing agent is preferably 1.5 to 20 parts based on 100 parts of the diene rubber (component (A)). If the proportion of the peroxide crosslinking agent is less than 1.5 parts, the resulting hose tends to have a low strength because of insufficient crosslinking. If the proportion of the peroxide crosslinking agent is more than 20 parts, the resulting hose tends to have a poor flexibility with high hardness.

As the material for forming the intermediated layer 2 (intermediate layer material) of the present invention, a material mainly composed of a tetrafluoroethylene-hexafluoropropylene-vinylidene fluoride-perfluoroalkyl vinyl ether quaternary polymer (THV) is used. The tetrafluoroethylene-hexafluoropropylene-vinylidene fluoride-perfluoroalkyl vinyl ether quaternary polymer (THV) is more excellent than a tetrafluoroethylene-hexafluoropropylene-vinylidene fluoride terpolymer (THV) which does not copolymerize with perfluoroalkyl vinyl ether in terms of craze resistance and fuel permeation resistance.

In addition, the intermediate layer material may include any of carbon black, a lubricant (such as wax), a colorant or the like, as required, together with THV.

The fuel hose of the present invention is produced, for example, by the following manner. Namely, the inner layer material, the intermediate layer material and the outer layer material are each prepared. These materials are continuously extruded by means of an extruder for forming a hose having an inner layer 1, an intermediate layer 2 formed on an outer peripheral surface of the inner layer and an outer layer 3 formed on an outer peripheral surface of the intermediate layer (as shown in FIGURE). In the fuel hose of the present invention, each interface is strongly adhered without use of adhesive in vulcanization of the hose so as to be integrally laminated.

The method of producing the fuel hose of the present invention is not limited to the above-mentioned manner. The fuel hose may be produced, for example, by extruding the inner layer material by an extruder for forming a single-layer structure, and then the intermediate layer material and the outer layer material are successively extruded in this order by each extruder for forming a three-layer structure. Each interface is generally adhered without use of adhesive. However, adhesive may be used supplementarily according to the case. Further, reinforcing fibers (such as polyester, vinylon, aramid and nylon) may be provided therebetween, as required.

In the fuel hose of the present invention, the inner layer 1 generally has a thickness of 0.2 to 4 mm, preferably 0.5 to 2 mm, and the intermediate layer 2 generally has a thickness of 0.02 to 1 mm, preferably 0.05 to 0.5 mm, and the outer layer 3 generally has a thickness of 0.2 to 4 mm, preferably 0.5 to 2 mm. The fuel hose of the present invention generally has an inner diameter of 2 to 50 mm, preferably 5 to 35 mm.

The fuel hose of the present invention is not limited to a three-layered structure, as shown in FIGURE. For example, the fuel hose of the present invention may include a rubber layer (innermost layer) provided on an inner peripheral surface of the inner layer 1 or a rubber layer (outermost layer) provided on an outer peripheral surface of the outer layer 3.

Next, an explanation will be given to Examples and Comparative Examples. It should be noted that the present invention is not limited to the Examples.

Prior to preparation of the Examples and the Comparative Example, the materials for diene rubber and NBR-PVC were prepared as follows.

Diene Rubber

Each material was blended at each ratio as shown in the following Table 1 and kneaded by a Banbury mixer and a roll for preparation of diene rubber.

TABLE 1

| | \multicolumn{7}{c}{(parts by weight) diene rubber material} | | | | | | |
|---|---|---|---|---|---|---|---|
| | A | B | C | D | E | F | a |
| NBR *1 | 100 | 100 | 100 | 100 | 100 | 100 | 100 |
| Stearic acid *2 | 1 | 1 | 1 | 1 | 1 | 1 | 1 |
| MgO *3 | 10 | 10 | 10 | 10 | 10 | 10 | — |
| ZnO *4 | — | — | — | — | 0.09 | — | 5 |
| DBU salt *5 | 1 | 1 | 1 | 1 | 1 | 1 | 1 |
| Carbon black *6 | 50 | 50 | 50 | 50 | 50 | 50 | 50 |
| Talc *7 | 25 | 25 | 25 | 25 | 25 | 25 | 25 |
| Basic silica *8 | 20 | 20 | 20 | 20 | 20 | 20 | 20 |
| Ether ester plasticizer *9 | 25 | 25 | 25 | 25 | 25 | 25 | 25 |
| Sulfur *10 | 1.5 | 1.5 | 1.5 | 1.5 | 1.5 | 1.5 | 1.5 |
| Vulcanizing accelerator (OBS) *11 | 1 | 1 | 1 | 1 | 1 | 1 | 1 |
| Peroxide vulcanizing agent *12 | — | — | — | — | — | 2 | — |
| ZnMBT *13 | 0.2 | — | — | — | 0.2 | 0.2 | 0.2 |
| ZnMDC *14 | — | 0.2 | — | — | — | — | — |
| ZnEDC *15 | — | — | 0.2 | — | — | — | — |
| ZnBDC *16 | — | — | — | 0.2 | — | — | — |

The materials shown in the Table 1 are described as follows.

NBR *1
  NIPOL DN101 (AN amount: 42.5) available from ZEON CORPORATION
Stearic Acid *2
  LUNAC S30 available from Kao Corporation
MgO *3
  KYOWA MAG #150 available from Kyowa Chemical Industry Co., Ltd.
ZnO *4
  ZINC OXIDE II available from Mitsui Mining & Smelting Co., Ltd.
DBU Salt *5
  DBU-naphthoate
Carbon Black *6
  SRF (Semi Reinforcing Furnace) carbon black (SEAST S available from Tokai Carbon Co., Ltd.)
Talc *7
  MISTRON VAPOR TALC available from Nihon Mistron Co., Ltd.
Basic Silica *8
  CARPLEX 1120 available from DSL Japan Co., Ltd.
Ether Ester Plasticizer *9
  ADK CIZER RS-107 available from ADEKA CORPORATION
Sulfur *10
  GOLDEN FLOWER SULFUR POWDER available from Tsurumi Kagaku K.K.
Thiazole Vulcanizing Accelerator (OBS) *11
  N-oxydiethylene-2-benzothiazolyl sulfenamide (OBS) (NOCCELER MSA-G available from OUCHI SHINKO CHEMICAL INDUSTRIAL CO., LTD.)
Peroxide Vulcanizing Agent *12
  Dicumyl peroxide (PERCUMYL D available NOF Corporation)
Metallic Salt of Thiazole *13
  Zinc mercaptobenzothiazole (ZnMBT) (NOCCELER MZ available from OUCHI SHINKO CHEMICAL INDUSTRIAL CO., LTD.)
Metallic Salt of Carbamate *14
  Zinc dimethyldithiocarbamate (ZnMDC) (NOCCELER PZ available from OUCHI SHINKO CHEMICAL INDUSTRIAL CO., LTD.)
Metallic Salt of Carbamate *15
  Zinc diethyldithiocarbamate (ZnEDC) (NOCCELER EZ available from OUCHI SHINKO CHEMICAL INDUSTRIAL CO., LTD.)
Metallic Salt of Carbamate *16
  Zinc dibutyldithiocarbamate (ZnBDC) (NOCCELER BZ available from OUCHI SHINKO CHEMICAL INDUSTRIAL CO., LTD.)
Preparation of NBR-PVC Material
  An NBR-PVC material was prepared by blending 100 parts of NBR-PVC, NIPOL 1203 JNS [(NBR/PVC=70/30 (weight ratio), AN amount: 33.5)] available from ZEON CORPORATION, 1 part of stearic acid (LUNAC S30 available from Kao Corporation), 10 parts of MgO (KYOWA MAG #150 available from Kyowa Chemical Industry Co., Ltd.), 2 parts of DBU-naphthoate (DA-500 available from DAISO CO., LTD.), 30 parts of SRF (Semi Reinforcing Furnace) carbon black (SEAST S available from Tokai Carbon Co., Ltd.), 10 parts of zeolite (MIZUKALIZER DS available from MIZUSAWA INDUSTRIAL CHEMICALS, LTD.), 20 parts of talc (MISTRON VAPOR TALC available from Nihon Mistron Co., Ltd.), 15 parts of basic silica (CARPLEX 1120 available from DSL Japan Co., Ltd.), 25 parts of ether ester plasticizer (ADK CIZER RS107 available from ADEKA CORPORATION), 1 part of sulfur (GOLDEN FLOWER SULFUR POWDER available from Tsurumi Kagaku K. K.) and 1 part of N-oxydiethylene-2-benzothiazolyl sulfenamide (OBS) (NOCCELER MSA-G available from OUCHI SHINKO CHEMICAL INDUSTRIAL CO., LTD.) as thiazole vulcanizing accelerator (OBS), and kneading the resulting mixture by means of Banbury mixer and a roll.

Examples 1 to 6 and Comparative Example 1

The materials for forming each layer prepared as above were used here. The materials of each combination shown in the following Table 2 were successively extruded by means of an extruder for forming a three-layered fuel hose (inner diameter: 24 mm) having an inner layer (thickness: 2 mm), an intermediate layer (thickness: 0.1 mm) formed on an outer peripheral surface of the inner layer, and an outer layer (thickness: 2 mm) formed on an outer peripheral surface of the intermediate layer.

TABLE 2

|  | EXAMPLE | | | | | | COMPARATIVE EXAMPLE |
|---|---|---|---|---|---|---|---|
|  | 1 | 2 | 3 | 4 | 5 | 6 | 1 |
| Inner layer | diene rubber material A | diene rubber material B | diene rubber material C | diene rubber material D | diene rubber material E | diene rubber material F | diene rubber material a |
| Intermediate layer | Fluoro-resin* | Fluoro-resin* | Fluoro-resin* | Fluoro-resin* | Fluoro-resin* | Fluoro-resin* | Fluoro-resin* |
| Outer layer | NBR-PVC material | NBR-PVC material | NBR-PVC material | NBR-PVC material | NBR-PVC material | NBR-PVC material | NBR-PVC material |
| Adhesion (N/inch) | 78 | 84 | 72 | 88 | 85 | 95 | 4 |

*THV815G available from Dyneon GmbH

Adhesion of the fuel hoses of Examples and Comparative Example was evaluated in the following manner. The results are also shown in the above Table 2.

Adhesion

Adhesion of each hose was determined in accordance with JIS (Japanese Industrial Standards) K 6330-6. Each specimen having one-inch length was cut out of each hose. The inner layer at the tip portion of each sample was peeled from the remaining layers. The tip portion of the peeled layer was pinched with a chuck of a tensile tester and peeled at a rate of 25.4 mm/min. Then, each minimum load until the specimen completely peeled off each other at 360 degrees was determined as adhesion (N/inch).

As can be understood from the results of Table 2, the fuel hoses of the Examples had excellent adhesion. The inventors confirmed that excellent adhesion could be obtained as same as the Examples in the case where DBU, DBN salt and/or DBN were used solely or in combinations instead of DBU salt.

On the other hand, the fuel hose of Comparative Example 1 which used the diene rubber, containing a large amount of ZnO instead of MgO, was remarkably inferior in adhesion. The fuel hose of the present invention is preferably used as an automotive fuel hose, however, it may be also used a as fuel hose for a tractor, a cultivator, a boat, a ship and the like.

What is claimed is:

1. A fuel hose comprising a laminated structure of a tubular resin layer and an adjoining rubber layer, the rubber layer being formed by
   a rubber composition containing the following (A) to (E) as essential components, the (B) being present at 0.5 to 5 parts by weight, the component (C) being present at 0.5 to 3 parts by weight, the component (D) being present at 0.01 to 0.5 parts by weight and the component (E) being present at 3 to 20 parts by weight respectively based on 100 parts by weight of the component (A), and the following (F) at less than 0.1 parts by weight based on 100 parts by weight of the following (A) as an optional component,
   and the resin layer being formed by a material containing a tetrafluoroethylene-hexafluoropropylene-vinylidene fluoride-perfluoroalkyl vinyl ether quaternary polymer as a main component:
   (A) diene rubber being at least one selected from the group consisting of a acrylonitrile-butadiene rubber, a blend of acrylonitrile-butadiene rubber and polyvinyl chloride, an ethylene-propylene-diene terpolymer and hydrin rubber;
   (B) a sulfur vulcanizing agent;
   (C) at least one selected from the group consisting of 1,8-diazabicyclo[5.4.0]undecene-7 salt, 1,5-diazabicyclo[4.3.0]nonene-5 salt, 1,8-diazabicyclo[5.4.0]undecene-7 and 1,5-diazabicyclo[4.3.0]nonene-5;
   (D) at least one of metallic salt of carbamate and metallic salt of thiazole, the metallic salt of carbamate being at least one selected from the group consisting of a zinc dimethyldithiocarbamate, zinc diethyldithiocarbamate and zinc dibutyldithiocarbamate, and the metallic salt of thiazole being zinc mercaptobenzothiazole;
   (E) magnesium oxide; and
   (F) zinc oxide.

2. A fuel hose as set forth in claim 1, wherein the rubber layer being formed by a rubber composition containing a peroxide vulcanizing agent together with the components (A) to (E) at 1.5 to 20 parts by weight based on 100 parts by weight of the component (A).

3. A fuel hose comprising a tubular inner layer, an intermediate layer formed on an outer peripheral surface of the inner layer and an outer layer formed on an outer peripheral surface of the intermediate layer, the inner layer and the outer layer being formed by
   a rubber composition containing the following (A) to (E) as essential components, the component (B) being present at 0.5 to 5 parts by weight, the component (C) being present at 0.5 to 3 parts by weight, the component (D) being present at 0.01 to 0.5 parts by weight and the component (E) being present at 3 to 20 parts by weight respectively based on 100 parts by weight of the component (A) and the following (F) at less than 0.1 parts by weight based on 100 parts by weight of the following (A) as an optional component, and the intermediate layer being formed by a material containing a tetrafluoroethylene-hexafluoropropylene-vinylidene fluoride-perfluoroalkyl vinyl ether quaternary polymer as a main component:
(A) diene rubber being at least one selected from the group consisting of acrylonitrile-butadiene rubber, a blend of acrylonitrile-butadiene rubber and polyvinyl chloride, an ethylene-propylene-diene terpolymer and hydrin rubber;
(B) a sulfur vulcanizing agent;
(C) at least one selected form the group consisting of
1,8-diazabicyclo[5.4.0]undecene-7 salt,
1,5-diazabicyclo[4.3.0]nonene-5 salt,
1,8-diazabicyclo[5.4.0]undecene-7 and
1,5-diazabicyclo[4.3.0]nonene-5;
(D) at least one of metallic salt of carbamate and metallic salt of thiazole, the metallic salt of carbamate being at least one selected from the group consisting of a zinc dimethyldithiocarbamate, zinc diethyldithiocarbamate and zinc dibutyldithiocarbamate, and the metallic salt of thiazole being zinc mercaptobenzothazole;
(E) magnesium oxide; and
(F) zinc oxide.

4. A fuel hose as set forth in claim 3, wherein the rubber layer being formed by a rubber composition containing a peroxide vulcanizing agent together with the components (A) to (E) at 1.5 to 20 parts by weight based on 100 parts by weight of the component (A).

* * * * *